United States Patent Office 2,976,319
Patented Mar. 21, 1961

2,976,319

CARBANILINOALKYLHYDRAZINIUM SALTS

Bernard Rudner, Pittsburgh, Pa., assignor to W. R. Grace & Co., New York, N.Y., a corporation of Connecticut No Drawing. Filed Oct. 15, 1958, Ser. No. 767,258

3 Claims. (Cl. 260—562)

This invention relates to quaternary nitrogenous salts. In one specific aspect, it relates to carbinilinoalkylhydrazinium salts.

It is an object of the present invention to provide a new generic class of pharmaceutically useful hydrazinium compounds.

The compounds of my invention are conveniently prepared by the action of chloramine on the appropriate tertiary amine. In the preferred practice of this invention, the reactant tertiary amine dissolved in an unreactive solvent is exposed to a stream of gaseous chloramine. The resultant carbanilinoalkylhydrazinium chloride is isolated by conventional laboratory techniques. Compounds containing anions other than chloride are prepared by metathesis starting with the chloride and a compound containing the anion to be introduced. Alternately, my novel compounds may be prepared by the alkylation of the appropriately substituted hydrazine compound with suitable carbanilinoalkyl halides.

In accordance with the present invention, I have made available a new class of hydrazinium compounds having the general formula:

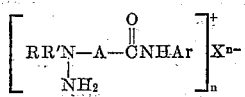

In the above formula, R and R' represent the lower alkyl group and A is a bivalent hydrocarbon residue (alkylene group) having less than five carbon atoms. Ar represents a phenyl radical or lower alkyl substituted phenyl radical such as tolyl, xylyl and the like. X is an anion bearing the charge $n$.

When my compounds are used for pharmaceutical purposes, X must be a pharmaceutically acceptable anion. The primary attributes of such an anion are nontoxicity and pharmaceutical compatibility. Otherwise, the choice of the anion is of little consequence, since the primary activity of my novel compounds resides in the cation. The salts obtained by variation of the anion may in some cases have special advantages due to solubility, ease of crystallization, lack of objectionable taste and the like, but these considerations are all subsidiary to the characteristics of the cation which are independent of the character of the anion. Hence all variations of X are considered equivalent for the purpose of the present invention. Specific, but non-limiting, variants of X are as follows: chloride, bromide, iodide, sulfate, bisulfate, acetate, salicylate, valerate, oleate, phenate, laurate, borate, benzoate, lactate, nitrate, diglycollate, phosphate, phenylethylbarbiturate, o-acetoxybenzoate, citrate, dialkylbarbiturate, sulfathiazole, theophyllinate, urate, maleate, fumarate, succinate, tartrate, diethylbarbiturate, penicillinate, camphorate, salicylamide, diphenylhydantoin, carbonate, cacodylate, aconitate, sulfamate, gentisate, malate and the like.

One method of preparing the novel compounds of my invention is to react chloramine with the tertiary amine corresponding to the desired hydrazinium compound; the product is isolated and purified by standard laboratory techniques. Since many of the amines are commercially available as their salts, the hydrochloride being the most common, it has been found convenient to treat aqueous solutions of the amine salts with base and extract the free amine with a solvent such as chloroform. After treatment of the extract with a conventional drying agent, the solution is ready for chloramination. While chloramine is most advantageously prepared as a gaseous chloramine-ammonia mixture obtained from a generator constructed according to the teachings of Sisler et al., U.S. Patent 2,710,248, other methods are equally adaptable for the purpose of the present invention. For instance, chloramine can be made by reacting chlorine with an excess of ammonia in carbon tetrachloride or similar halogenated hydrocarbon solvents under controlled conditions of mixing at low temperatures. Such a process is fully described in U.S. Patent 2,678,258 to John F. Haller. Another effective procedure is that of Coleman et al. fully described in Inorganic Syntheses, vol. I, 59 (1939). Alternatively, the chloramine can be formed in the presence of the amine as described in the copending application Serial No. 605,230, filed August 20, 1956, which teaches the reaction of chlorine and a tertiary amine in the presence of excess ammonia. For simplicity, when both the amine and the product are soluble in the same inert solvent, e.g., chloroform, chloramine may be formed in situ by this method right in the solution containing the reactant tertiary amine. In general, the choice of solvent is one of economy and simplicity. When preformed chloramine is used and good absorption is required for efficient reaction, it has been found desirable to bubble chloramine through a long column of a solution comprising the tertiary amine dissolved in relatively cheap inert solvent. By inert solvent it is meant a solvent unreactive under the condition of the reaction. Solvents which serve this purpose include hydrocarbons, e.g., heptane, cyclohexane, benzene, xylene and the like; ethers, e.g., diethyl ether, diamyl ether, dioxane and anisole; amides, e.g., dimethylformamide and dimethylacetamide; halohydrocarbons, e.g., chloroform, carbon tetrachloride, trichloroethylene and chlorobenzene; nitroaromatics, e.g., nitrobenzene. For special purposes, water and other hydroxylic solvents such as ethyl alcohol and Cellasolve may be used. When the reaction is conducted in anhydrous solution, the product often precipitates as the reaction progresses. In aqueous solution, however, it is usually necessary to concentrate or to evaporate to dryness in order to isolate the product.

Another method of preparing the novel compounds of my invention is the reaction of hydroxylamine-o-sulfonic acid with tertiary amines which produces the hydrazinium sulfate corresponding to the tertiary amine used. Preferably the appropriate tertiary amine and hydroxylamine-o-sulfonic acid are allowed to react or are heated together in the presence of an alcoholic solvent but excess amine or other suitable solvents may be used. Even though the use of a solvent is not required, superior results are obtained with a solvent because of the extremely exothermic reaction that quite often results. A frequent purification step is the treatment of the reaction mixture with a basic substance such as sodium carbonate to remove acidic constituents from the product hydrazinium sulfate which is essentially neutral and stable to the action of base. Further purification is effected by standard laboratory techniques.

It is obvious that not all of the novel hydrazinium compounds of my invention are capable of being prepared directly as shown above. In order to provide the other useful salts of the present invention, it is necessary to prepare the compounds containing anions other than chloride or sulfate by metathesis. Many of the anions described supra can be obtained by mixing aqueous solutions of the hydrazinium chloride with appropriate reagents. More often than not, the desired product precipitates directly as the reaction progresses. This is the case where the new salt being formed is less soluble or insoluble in water. Other metathetical approaches are available and the method selected depends on experimental convenience, costs of reagents and the differences in physical properties between the product and the starting material to be utilized in their separation. Reaction of a hydrazinium halide with a soluble silver salt, such as silver nitrate, results in the precipitation of silver halide and the formation of the hydrazinium nitrate. In an analogous manner, treatment of the sulfate with a soluble barium salt results in the precipitation of barium sulfate and conversion to the anion of the barium salt. Quite often the appropriate reactants are heated together in the absence of a solvent and the product isolated by standard laboratory techniques. Another approach independent of the formation of an insoluble solid is to react the halide with an excess of the desired anion as its acid; hydrogen halide is evolved as the new salt is formed. When it is necessary to prepare a very soluble salt, the reaction of the hydrazinium hydroxide with equivalent amounts of the appropriate acid may be utilized; this approach is also used for the preparation of very pure compounds. (Subjecting a hydrazinium halide to the action of moist silver oxide will give the hydrazinium hydroxide.)

The scope and utility of my invention is further illustrated by the following examples:

*Example I*

Thirteen grams of diethylamino-2,6-dimethylacetanilide hydrochloride (xylocaine hydrochloride) were treated with aqueous sodium bicarbonate and the free base immediately extracted with chloroform. The chloroform extract was dried, made up to 500 ml. and reacted with the gaseous chloramine made from 14 g. of chlorine. The product was isolated by evaporation of the filtrate after filtration from a precipitate of essentially ammonium chloride. The 9 g. of crude product was triturated and washed repeatedly with benzene to give 5 g. of 1,1-diethyl-1 - (2,6 - dimethylphenylcarbanilinomethyl)hydrazinium chloride as a white powder containing 11.48% Cl⁻ and melting 170–172° C.

*Examples II and III*

Treatment of separate aqueous solutions of the product with saturated aqueous solutions of potassium hexafluorophosphate and picric acid gave the corresponding hydrazinium hexafluorophosphate (M.P. 150–155° C.) and hydrazinium picrate (M.P. 170–175° C.), respectively which were formed as insoluble precipitates and collected by filtration.

*Example IV*

The product of Example I was dissolved in physiological saline at concentrations of 1.0 and 20 mg./ml. A female dog, weighing 7.3 kg., received intravenous doses of 0.5, 1.0, 5.0, 10 and 15 mg./kg. over a period of approximately three hours. The injection of 0.5 mg./kg. caused a very slight and transient fall in blood pressure with no apparent effect on respiration. Doses of 1.0, 5.0, and 10 mg./kg. caused moderate falls in blood pressure of several minutes' duration with the magnitude of the depressor response apparently dependent upon the amount of the dose. Slight respiratory depression was observed after both the 5.0 and 10 mg./kg. doses. The depressor response to acetylcholine appeared to be slightly antagonized following doses of 1.0 mg./kg. and greater. At no time was there marked antagonism to the acetylcholine response, indicating that the compound possesses little, if any atropine-like activity. The pressor response to epinephrine and nor-epinephrine appeared to be enhanced following doses of 1,1-diethyl-1-(2,6-dimethylphenylcarbanilinomethyl)hydrazinium chloride at all levels administered. The depressor response to histamine was markedly prolonged in duration following the 1.0, 5.0 and 10 mg./kg. doses; the depressor activity of histamine is apparently potentiated.

I claim:

1. Chemical compounds of the formula:

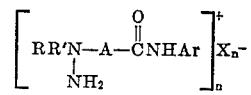

wherein R and R' are lower alkyl; A is an alkylene radical having less than five carbon atoms; Ar is a member selected from the group consisting of phenyl and lower alkyl phenyl; X is a pharmaceutically acceptable anion; and $n$ is an integer less than four.

2. Compounds according to claim 1 wherein Ar is lower alkyl phenyl.

3. 1,1 - diethyl-1-(2,6-dimethylphenylcarbanilinomethyl)hydrazinium chloride.

No references cited.